(12) United States Patent
Bao et al.

(10) Patent No.: US 6,961,480 B2
(45) Date of Patent: Nov. 1, 2005

(54) OFF-GRID INTERPOLATION IN IMAGE PROCESSING

(75) Inventors: Yiliang Bao, Torrance, CA (US); Maged Bishay, Costa Mesa, CA (US); Joshua I. Pine, Seal Beach, CA (US)

(73) Assignee: ESS Technology, Inc., Fremont, CA (US)

( * ) Notice: Subject to any disclaimer, the term of this patent is extended or adjusted under 35 U.S.C. 154(b) by 633 days.

(21) Appl. No.: 09/949,688

(22) Filed: Sep. 10, 2001

(65) Prior Publication Data

US 2003/0053687 A1 Mar. 20, 2003

(51) Int. Cl.⁷ .............................................. G06K 9/32
(52) U.S. Cl. ..................................... 382/300; 382/162
(58) Field of Search ................................ 382/162–167, 382/288–300

(56) References Cited

U.S. PATENT DOCUMENTS

| 5,657,082 | A | * | 8/1997 | Harada et al. ............... 348/262 |
|---|---|---|---|---|
| 5,754,710 | A | * | 5/1998 | Sekine et al. ............... 382/300 |
| 5,937,085 | A | * | 8/1999 | Ishida ......................... 382/162 |
| 6,181,376 | B1 | * | 1/2001 | Rashkovskiy et al. ...... 348/273 |
| 6,333,762 | B1 | * | 12/2001 | Yoo et al. .................... 348/441 |
| 6,563,538 | B1 | * | 5/2003 | Utagawa ..................... 348/273 |
| 6,597,819 | B1 | * | 7/2003 | Ito .............................. 382/300 |
| 6,611,632 | B1 | * | 8/2003 | Tomiyama et al. ......... 382/300 |
| 6,631,216 | B2 | * | 10/2003 | Hieda et al. ................ 382/300 |
| 6,674,430 | B1 | * | 1/2004 | Kaufman et al. ........... 345/419 |
| 6,756,993 | B2 | * | 6/2004 | Popescu et al. ............. 345/646 |

* cited by examiner

Primary Examiner—Jingge Wu
(74) Attorney, Agent, or Firm—Farjami & Farjami LLP

(57) ABSTRACT

Off-grid interpolation in image processing. The present invention provides for a more perceptually pleasing resultant image when compared to conventional image processing systems that employ on-grid interpolation. In one embodiment, the present invention is operable on a digital image generated using a mask having a Bayer pattern distribution. Off-grid RGB triplets are generated using the raw data received from the Bayer pattern mask. The undesirable mosaic-type images as well as the bright and dark discontinuities within the image that are often generated using conventional on-grid interpolation to generate RGB triplet are avoided when using the present invention. The undesirable cross talk effects that are practically unavoidable to some degree within all digital image masks are also substantially minimized. Bi-linear interpolation and cubic linear interpolation are employed to achieve a digital image having a high visually perceptual quality. The invention ensures that very thin contours and lines within the image will maintain a consistent intensity and uniformity. Where the implementation of conventional on-grid interpolations image processing systems often compromises the quality of such objects, e.g., thin lines can get a broken or dashed appearance, the present invention ensures that they maintain an accurate perceptual consistency.

25 Claims, 10 Drawing Sheets

OFF-GRID INTERPOLATION IN IMAGE PROCESSING

CROSS REFERENCE TO RELATED APPLICATIONS

The following U.S. patent application is incorporated by reference in its entirety and made part of this U.S. patent application for all purposes. U.S. patent application Ser. No. 10/102,105, entitled "IMAGE RESOLUTION CONVERSION USING PIXEL DROPPING," filed Mar. 20, 2002.

BACKGROUND OF THE INVENTION

1. Field of the Invention

The invention relates to image processing and, more particularly, relates to off-grid interpolation performed in image processing.

2. Related Art

Conventional image processing systems that perform interpolation within a Bayer pattern seek to perform interpolation to generate a triplet that is located actually on the various pixel locations within the Bayer pattern. For an illustrative example, four of the centrally located pixels within the 5×4 pixel Bayer pattern shown below are used to create RGB triplets using this conventional approach.

The four bold faced locations within the Bayer pattern shown below:

R0, G0, R1, G1, R2
G2, B0, G3, B1, G4
R3, G5, R4, G6, R5
G7, B2, G8, B3, G9 can be used generate the following RGB triplets:
($\frac{1}{4}$*(R0+R1+R3+R4), $\frac{1}{4}$*(G0+G2+G3+G5), B0) ($\frac{1}{2}$*(R1+R4), G3, $\frac{1}{2}$*(B0+B1))
($\frac{1}{2}$*(R3+R4), G5, $\frac{1}{2}$*(B0+B2)) (R4, $\frac{1}{4}$*(G5+G3+G6+G8), $\frac{1}{4}$(B0+B1+B3+B2))

Alternative methods of performing the RGB generation within the Bayer pattern are also performed in conventional interpolation image processing systems as shown below.
($\frac{1}{2}$*(R1+R3), $\frac{1}{2}$*(G0+G5), B0) ($\frac{1}{2}$* (R1+R4), G3, $\frac{1}{2}$*(B0+B1))
($\frac{1}{2}$*(R3+R4), G5, $\frac{1}{2}$*(B0+B2)) (R4, $\frac{1}{2}$*(G3+G8), $\frac{1}{2}$*(B1+B2))

Depending on how many adjacent or neighboring pixels are to be used, the color shown by the RGB triplet may or may not be an accurate representation of the actual image that was acquired by the mask. Other methods of performing the generation of on-grid RGB triplets are also performed in conventional image processing systems.

In addition, the conventional methods of performing on-grid interpolation result in other perceptual and qualitative deficiencies. For example, for very thin lines within an input image, the intensity of the line is sometimes inconsistent, and it even becomes a broken line in some cases. In addition, non-uniformity in the image due to mismatches of the mask performing the image acquisition can also result in mosaic-type of images within conventional image processing systems. Moreover, cross talk between adjacent pixels within the mask, during image acquisition, can also result in many undesirable artifacts within the input image. Each of these deficiencies result in the deleterious effects of improper and often poor image representation using RGB triplets of a Bayer pattern distributed mask.

Similarly, gray scale images will suffer from deleterious effects such as inconsistent line intensity and sometimes being shown as a broken line when performing on-grid interpolation as known in the art of image processing.

SUMMARY

Various aspects of the present invention can be found in an off-grid interpolation image processing system. The off-grid interpolation image processing system includes a processing circuitry. The processing circuitry is operable to perform image processing of raw input data to generate off-grid data points. The processing circuitry selects a fixed number of neighboring pixels within the raw input data to generate at least one of the off-grid data points. The processing circuit performs bi-linear interpolation on red pixels and on blue pixels within the raw input data. The processing circuit performs cubic interpolation on green pixels within the raw input data. The off-grid data points are RGB triplets.

In certain embodiments of the invention, a number corresponding to the neighboring pixels to be selected is programmed within the processing circuitry. The locations corresponding to the off-grid data points are programmed within the processing circuitry. The locations corresponding to the off-grid data points are adaptively selected based on the fixed number of neighboring pixels within the raw input data. The fixed number of neighboring pixels within the raw input data is the nearest four pixels or the nearest sixteen pixels. One of the off-grid data points is centrally located between locations of other of the raw input data. One of the off-grid data points is not located in a vicinity of the fixed number of neighboring pixels within the raw input data.

Other aspects of the present invention can be found in an off-grid interpolation image processing system. The off-grid interpolation image processing system includes a processing circuitry that is operable to perform image processing of raw input data to generate off-grid data points. The processing circuitry selects a fixed number of neighboring pixels within the raw input data to generate one of the off-grid data points. The processing circuit performs pixel interpolation using the fixed number of neighboring pixels, and at least one of the off-grid data points is centrally located between locations of other of the raw input data.

In certain embodiments of the invention, the processing circuit performs bi-linear interpolation on red pixels and on blue pixels within the raw input data, and the processing circuit performs cubic interpolation on green pixels within the raw input data. The locations corresponding to the off-grid data points are programmed within the processing circuitry. One of the off-grid data points is off-centrally located between locations of other of the raw input data. The fixed number of neighboring pixels within the raw input data is the nearest four pixels. One of the off-grid data points is located in a vicinity of the fixed number of neighboring pixels within the raw input data. The off-grid interpolation image processing system also includes a mask that performs image capture of the plurality of raw input data in a Bayer pattern format.

Other aspects of the present invention can be found in a method to perform off-grid interpolation. The method involves inputting raw input data to generate off-grid data points, selecting a fixed number of neighboring pixels within the raw input data to generate one of the off-grid data points, performing pixel interpolation using the fixed number of neighboring pixels to generate the off-grid data points, and one of the off-grid data points is centrally located between locations of other of the plurality of raw input data.

In certain embodiments of the invention, the method also involves performing bi-linear interpolation on red pixels and on blue pixels within the raw input data, and performing cubic interpolation on green pixels within the raw input data. Locations corresponding to the off-grid data points are programmed within the processing circuitry are predetermined. The locations corresponding to the off-grid data points are programmed within the processing circuitry and are adaptively selected as a function of the fixed number of neighboring pixels within the raw input data. The fixed number of neighboring pixels within the raw input data is the nearest four pixels.

Other aspects, advantages and novel features of the present invention will become apparent from the following detailed description of the invention when considered in conjunction with the accompanying drawings.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Figure 1:
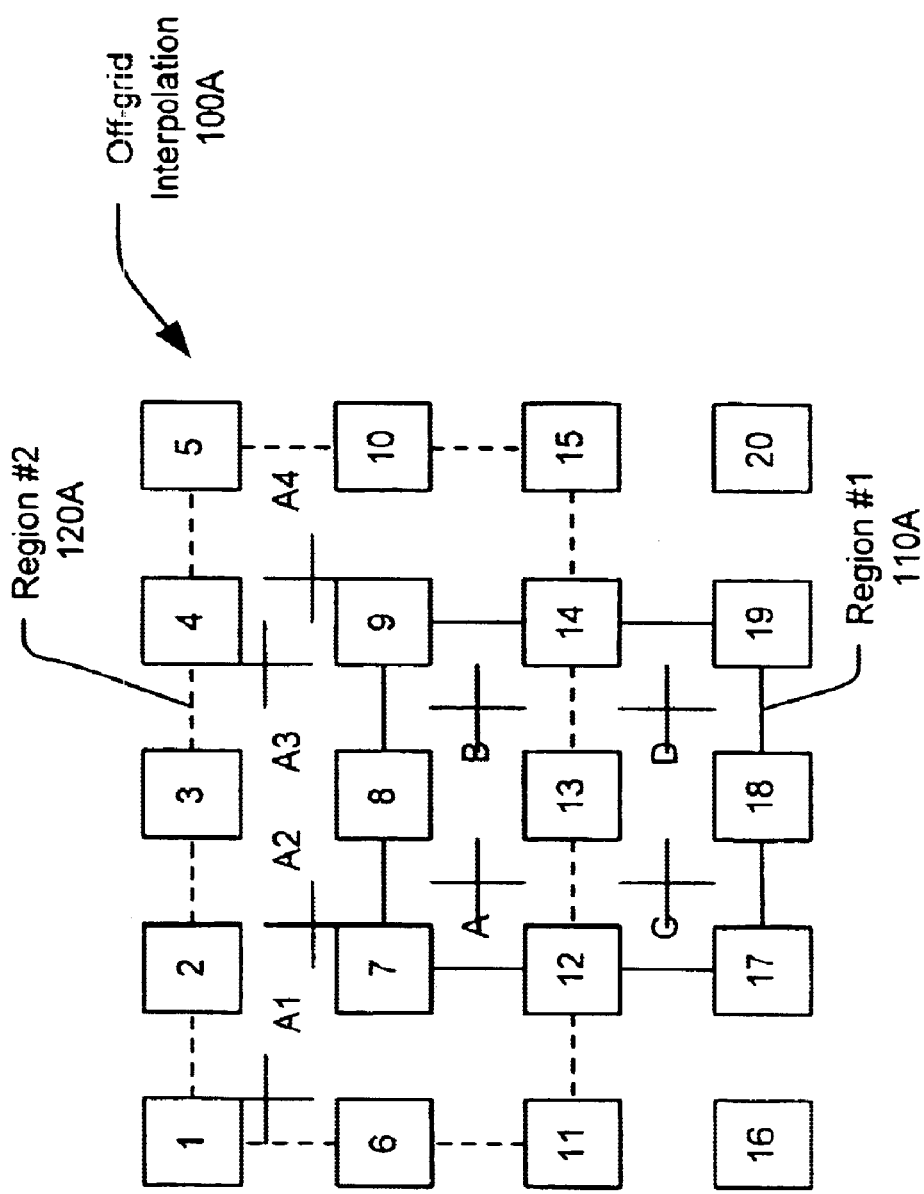
FIG. 1 is a system diagram illustrating an embodiment of off-grid interpolation.

FIG. 1 is a system diagram illustrating an embodiment of off-grid interpolation 100A performed in accordance with the present invention. A number of pixels 1–20 are shown as being distributed from left to right and top to bottom in the FIG. 1. The off-grid locations A, B, C, and D illustrate off-grid interpolation of adjacent pixels wherein the off-grid locations A, B, C, and D are centrally located between the adjacent pixels. Pixels 7, 8, 9, 12, 13, 14, 17, 18, and 19 that are located within a region #1 110A are used to calculate the off-grid pixel locations A, B, C, and D.

The off-grid locations A1, A2, A3, and A4 illustrate off-grid interpolation of adjacent pixels wherein the off-grid locations A1, A2, A3, and A4 are not centrally located between the adjacent pixels. They are all located off center based on the distribution of the pixel grid shown by the pixels 1–20. Pixels 1, 2, 3, 4, 5, 6, 7, 8, 9, 10, 11, 12, 13, 14, and 15 that are located within a region #2 120A are used to calculate the off-grid pixel locations A1, A2, A3, and A4. Other ways of clustering and grouping the pixels within the FIG. 1 are also used in various embodiments of the invention. The particular weighting of the neighboring pixels to generate the off-grid locations of A, B, C, and D as well as A1, A2, A3, and A4 is also controllable within the invention.

Figure 2:
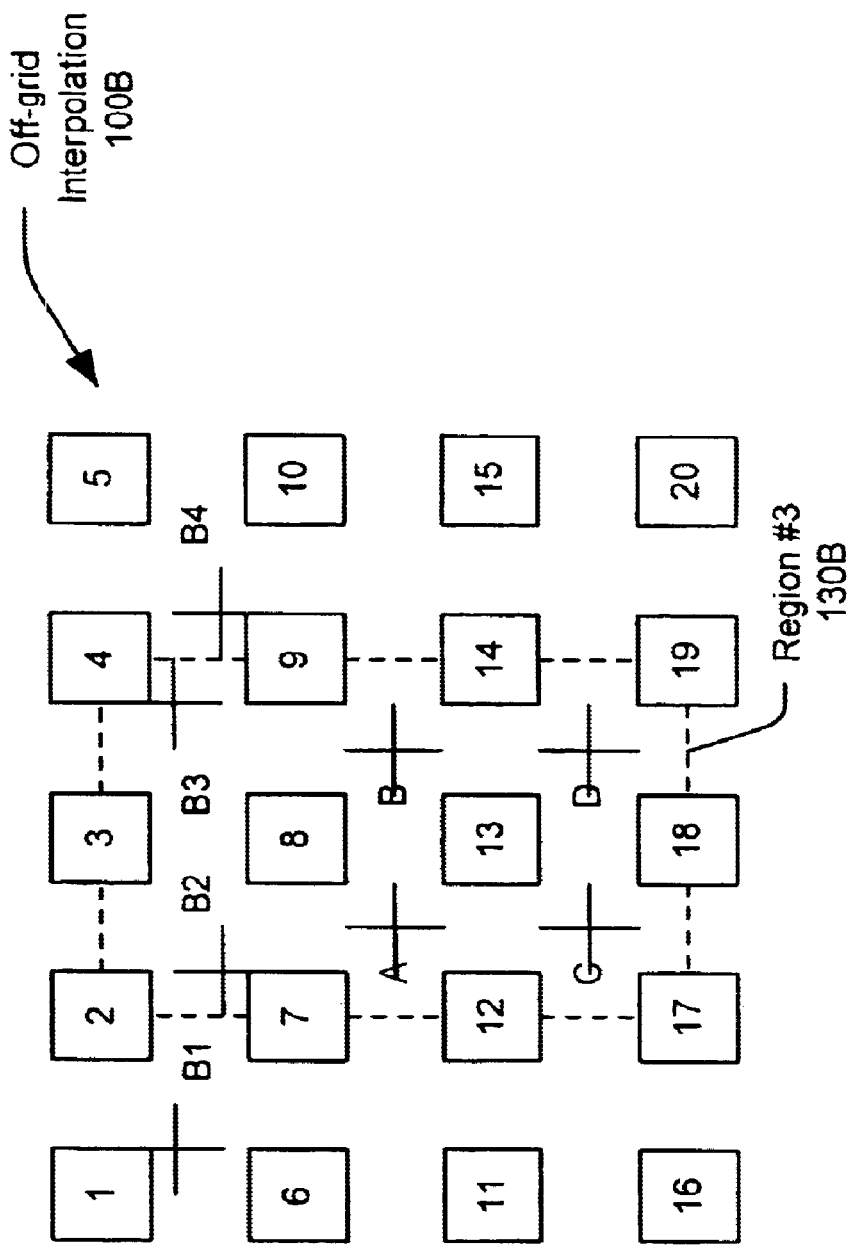
FIG. 2 is a system diagram illustrating another embodiment of off-grid interpolation.

FIG. 2 is a system diagram illustrating another embodiment of off-grid interpolation 100B performed in accordance with the present invention. A number of pixels 1–20 are shown as being distributed from left to right and top to bottom in the FIG. 2. The off-grid locations A, B, C, and D illustrate off-grid interpolation of adjacent pixels wherein the off-grid locations A, B, C, and D are centrally located between the adjacent pixels. Pixels 2, 3, 4, 7, 8, 9, 12, 13, 14, 17, 18, and 19 that are located within a region #3 130B are used to calculate the off-grid pixel locations A, B, C, and D. Similarly, the off-grid locations B1, B2, B3, and B4 illustrate off-grid interpolation of adjacent pixels wherein the off-grid locations B11, B2, B3, and B4 are not centrally located between the adjacent pixels. They are all located off center based on the distribution of the pixel grid shown by the pixels 1–20.

The same pixels within the region #3 130B are also used to calculate the off-grid pixel locations B1, B2, B3, and B4. The region #3 130B shows one example of how the pixels clustered within a region are used to calculate off-grid locations (B1 and B4 particularly) where those off-grid locations are outside of the region (the region #3 130B particularly). Other ways of clustering and grouping the pixels within the FIG. 2 are also used in various embodiments of the invention. The particular weighting of the neighboring pixels to generate the off-grid locations of A, B, C, and D as well as B1, B2, B3, and B4 are also controllable within the invention.

Figure 3:
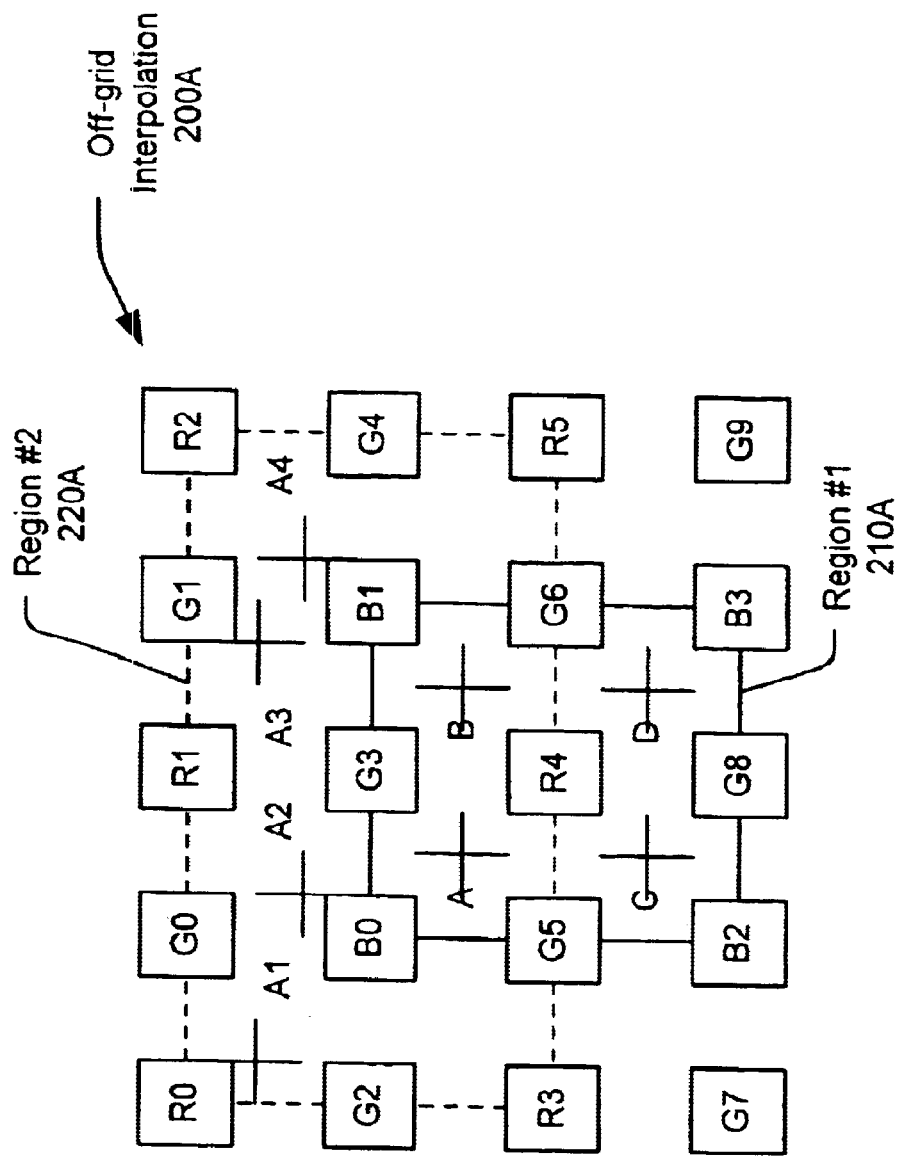
FIG. 3 is a system diagram illustrating another embodiment of off-grid interpolation on a Bayer pattern image.

FIG. 3 is a system diagram illustrating another embodiment of off-grid interpolation 200A performed in accordance with the present invention on a Bayer pattern image. A number of pixels are shown as being distributed, from left to right and top to bottom, in a Bayer pattern as shown as having the pixels, R0, G0, R1, G1, R2, G2, B0, G3, B1, G4, R3, G5, R4, G6, R5, G7, R4, G6, R5, G7, B2, G8, B3, and G9. The off-grid locations A, B, C, and D illustrate off-grid interpolation of adjacent pixels wherein the off-grid locations A, B, C, and D are centrally located between the adjacent pixels. Pixels B0, G3, B1, G5, R4, G6, B2, G8, and B3 that are located within a region #1 210A are used to calculate the off-grid pixel locations A, B, C, and D.

The off-grid locations A1, A2, A3, and A4 illustrate off-grid interpolation of adjacent pixels wherein the off-grid locations A1, A2, A3, and A4 are not centrally located between the adjacent pixels. They are all located off center based on the distribution of the pixel grid shown by the above-referenced pixels. Pixels B0, G3, B1, G5, R4, G6, B2, G8, and B3 that are located within a region #2 220A are used to calculate the off-grid pixel locations A1, A2, A3, and A4. Other ways of clustering and grouping the pixels within the FIG. 3 are also used in various embodiments of the invention. The particular weighting of the neighboring pixels to generate the off-grid locations of A, B, C, and D as well as A1, A2, A3, and A4 are also controllable within the invention.

Figure 4:
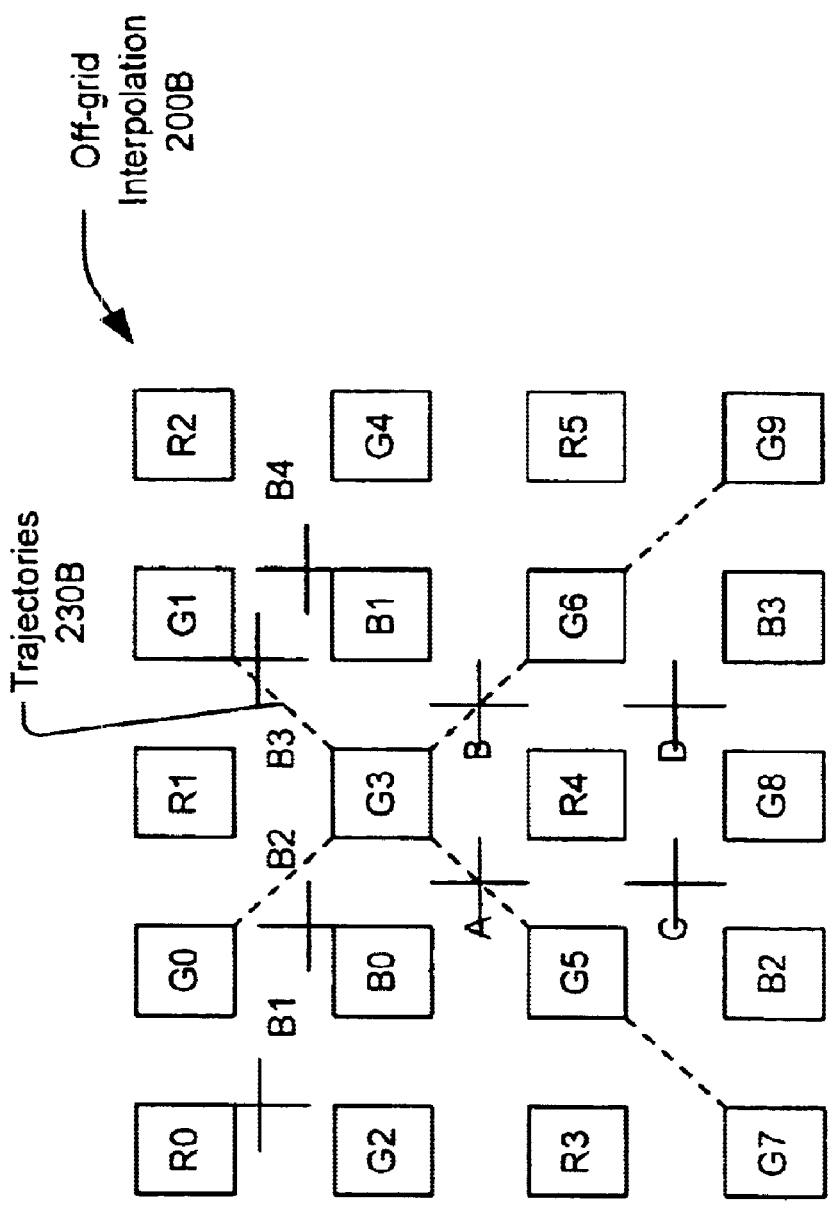
FIG. 4 is a system diagram illustrating another embodiment of off-grid interpolation on a Bayer pattern image.

FIG. 4 is a system diagram illustrating another embodiment of off-grid interpolation 200B performed in accordance with the present invention on a Bayer pattern image. A number of pixels are shown as being distributed, from left to right and top to bottom, in a Bayer pattern as shown as having the pixels, R0, G0, R1, G1, R2 G2, B0, G3, B1, G4, R3, G5, R4, G6, R5, G7, B2, G8, B3, and G9. The off-grid locations A, B, C, and D illustrate off-grid interpolation of adjacent pixels wherein the off-grid locations A, B, C, and D are centrally located between the adjacent pixels. Pixels G0, G1, G3, G5, G6, G7, and G9 that are located along a number of trajectories 230B are used to calculate the off-grid pixel locations A, B, C, and D. Similarly, the same pixels located along number of trajectories 230B also used to calculate the off-grid pixel locations B1, B2, B3, and B4. Other ways of clustering, grouping, and trajectories among the pixels within the FIG. 4 are also used in various embodiments of the invention. The particular weighting of the neighboring pixels to generate the off-grid locations of A, B, C, and D as well as BI. B2. B3, and B4 is also controllable within the invention.

In certain embodiments of the invention, in off-grid interpolation performed in accordance with the present invention as shown above in the FIGS. 3 and 4, the Bayer pattern grid of the interpolated image does not lie directly on the top of the imager grid. Instead, each of the off-grid pixel locations A, B, C, and D positions within both the FIGS. 3 and 4 are a half a pixel away from the imager grid in both directions. All of the color values are interpolated from multiple pixel values of the imager.

A basic off-grid interpolation method can be expressed by using the equations below. The red color within the triplet is interpolated from 4 red pixels forming a square that encloses the interpolated point. For example, R0, R1, R3 and R4 are used in interpolating the red value at the off-grid location A. This is similarly true for the blue value. The green value is only generated from the 2 closest green pixels by performing linear interpolation.

One way to perform the calculation of $R^A$, $G^A$, and $B^A$ is described in the equations below.

$$R^A = \frac{1}{16} \cdot (9 \cdot R_4 + 3 \cdot (R_1 + R_3) + R_0)$$

$$G^A = \frac{1}{2} \cdot (G_5 + G_3)$$

$$B^A = \frac{1}{16} \cdot (9 \cdot B_0 + 3 \cdot (B_1 + B_2) + B_3)$$

Similarly, the calculation of $R^B$, $G^B$, and $B^B$ is described in the equations below.

$$R^B = \frac{1}{16} \cdot (9 \cdot R_4 + 3 \cdot (R_1 + R_5) + R_2)$$

$$G^B = \frac{1}{2} \cdot (G_3 + G_6)$$

$$B^B = \frac{1}{16} \cdot (9 \cdot B_1 + 3 \cdot (B_0 + B_3) + B_2)$$

There are 4 different types of locations in the interpolation image. Equations for only locations A and B are given here, but the equations for locations C and D are obtained similarly.

This off-grid interpolation scheme generates results that sometimes look slightly more blurred than those obtained with conventional on-grid interpolation methods. However, it is important to keep in mind that some of the textures on an interpolated image from on-grid interpolation are in fact artifacts, and not in fact portions of the actual image itself.

The invention provides for enhancement of the edges of an image by performing cubic interpolation on green pixels within the image. No additional line buffers are required to perform this enhancement. The cubic interpolation is only performed one dimensionally. In generating the green value at location A and B, the following equations are used.

$$G^A = \frac{1}{16} \cdot (9 \cdot (G_5 + G_3) - (G_1 + G_7))$$

$$G^B = \frac{1}{16} \cdot (9 \cdot (G_3 + G_6) - (G_0 + G_9))$$

Figure 5:
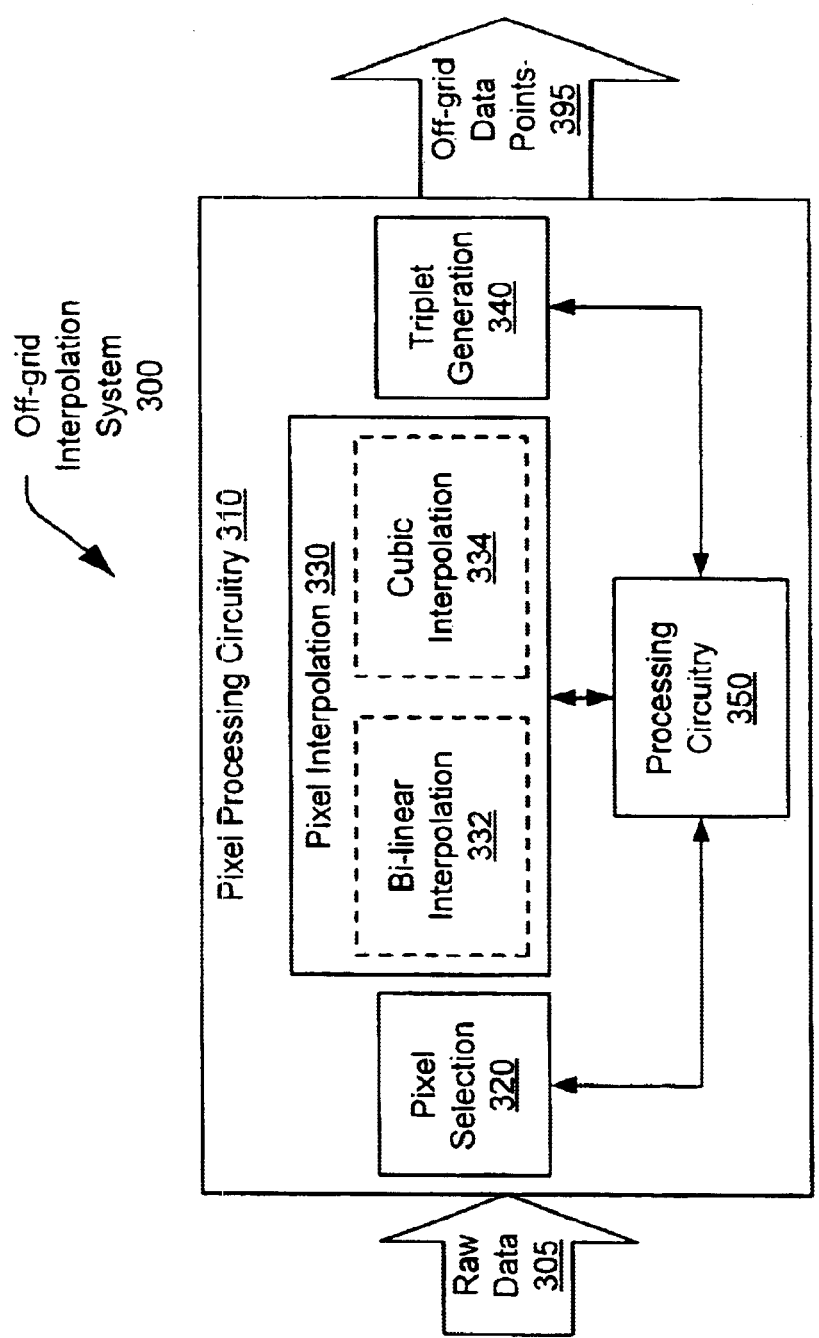
FIG. 5 is a system diagram illustrating another embodiment of an off-grid interpolation system.

FIG. 5 is a system diagram illustrating another embodiment of an off-grid interpolation 334 system 300. The off-grid interpolation system 300 operates on a number of raw data 305 to generate a number of off-grid data points 395. The off-grid interpolation system 300 itself contains, among other things, a pixel processing circuitry 310 to perform the image processing on the raw data 305. The pixel processing circuitry itself employs processing circuitry 350 to perform various image processing operations including pixel selection 320, pixel interpolation 330, and triplet generation 340. The pixel interpolation 330 performs one or both of bi-linear interpolation 332 and cubic interpolation 334 on the raw data 320 to generate the off-grid data points 395.

Figure 6:
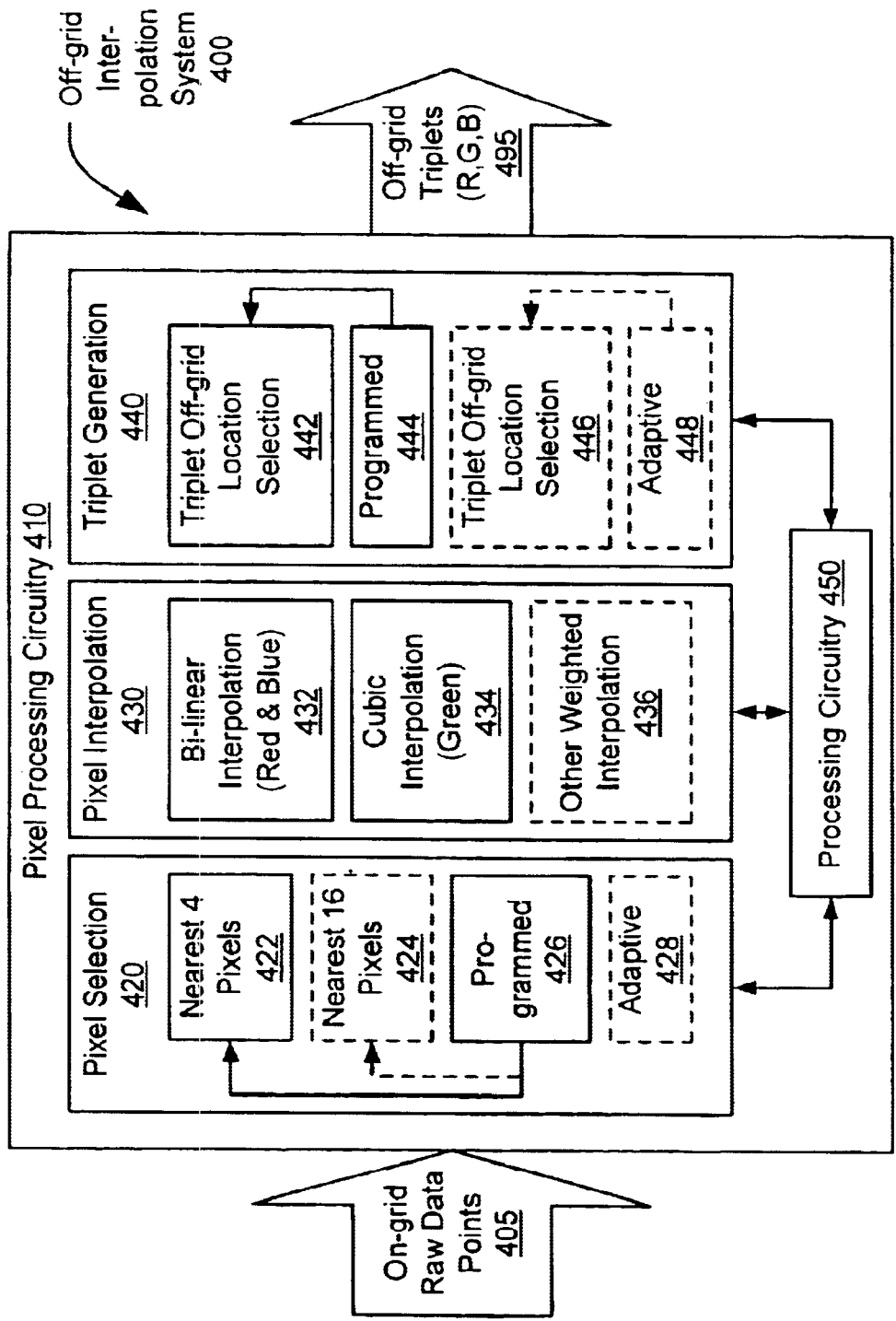
FIG. 6 is a system diagram illustrating another embodiment of an off-grid interpolation system.

FIG. 6 is a system diagram illustrating another embodiment of an off-grid interpolation system 400. The off-grid interpolation system 400 operates on a number of on-grid raw data 405 to generate a number of off-grid triplets (R, G, B) 495. The off-grid interpolation system 400 itself contains, among other things, a pixel processing circuitry 410 to perform the image processing on the on-grid raw data 405. The pixel processing circuitry 410 itself employs processing circuitry 450 to perform various image processing operations including pixel selection 420, pixel interpolation 430, and triplet generation 440. The pixel interpolation 430 performs one or both of bi-linear interpolation 432 and cubic interpolation 434 on the raw data selected from pixel selection 420 to generate the off-grid triplets (R, G, B) 495.

The pixel selection 420 includes selecting a predetermined number of pixels including the nearest 4 pixels as shown in a block 422 or the nearest 16 pixels as shown in an optional block 424. The predetermined values as shown in the blocks 422 and 424 are programmed as shown by a block 426 in certain embodiments of the invention. In other embodiments, the pixel selection 420 is adaptive as shown in a block 428. The pixel selection 420 that is shown as adaptive 428 is performed as a function of neighboring pixels within the on-grid raw data 405.

Figure 7:
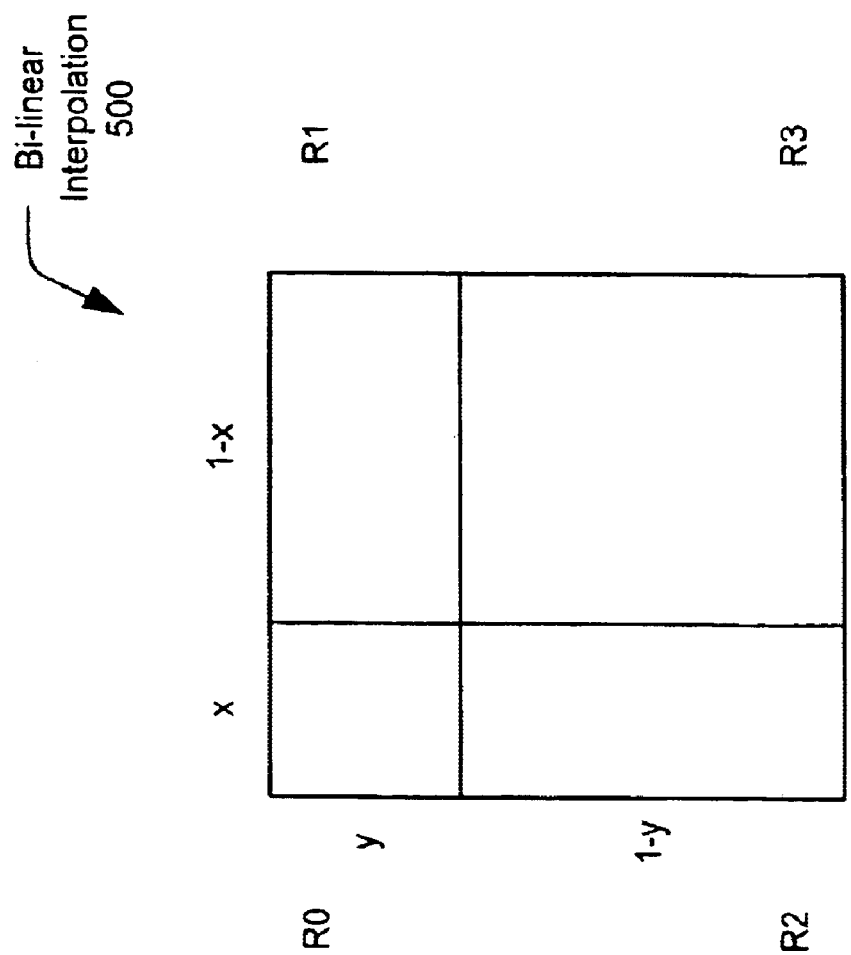
FIG. 7 is a system diagram illustrating an embodiment of bi-linear interpolation.

FIG. 7 is a system diagram illustrating an embodiment of bi-linear interpolation 500 performed by finding a value within a rectangle using the values at four vertices of the rectangle as shown in the FIG. 5. The four vertices are shown as R0, R1, R2, and R3, and the rectangle is partitioned into four regions as shown by the sub-rectangles having lengths and widths as follows: x and y, 1−x and y, x and 1−y, and 1−x and 1−y.

$$R = (R_0 \cdot (1-x) + R_1 \cdot x) \cdot (1-y) + (R_2 \cdot (1-x) + R_3 \cdot x) \cdot y$$
$$= R_0 \cdot (1-x) \cdot (1-y) + R_1 \cdot x \cdot (1-y) + R_2 \cdot (1-x) \cdot y + R_3 \cdot x \cdot y$$

If the embodiment where both x and y are ¼, then the preceding equation is reduced to the following:

$$R = \frac{R_0 \cdot 9 + (R_1 + R_2) \cdot 3 \cdot y + R_3}{16}$$

Figure 8:
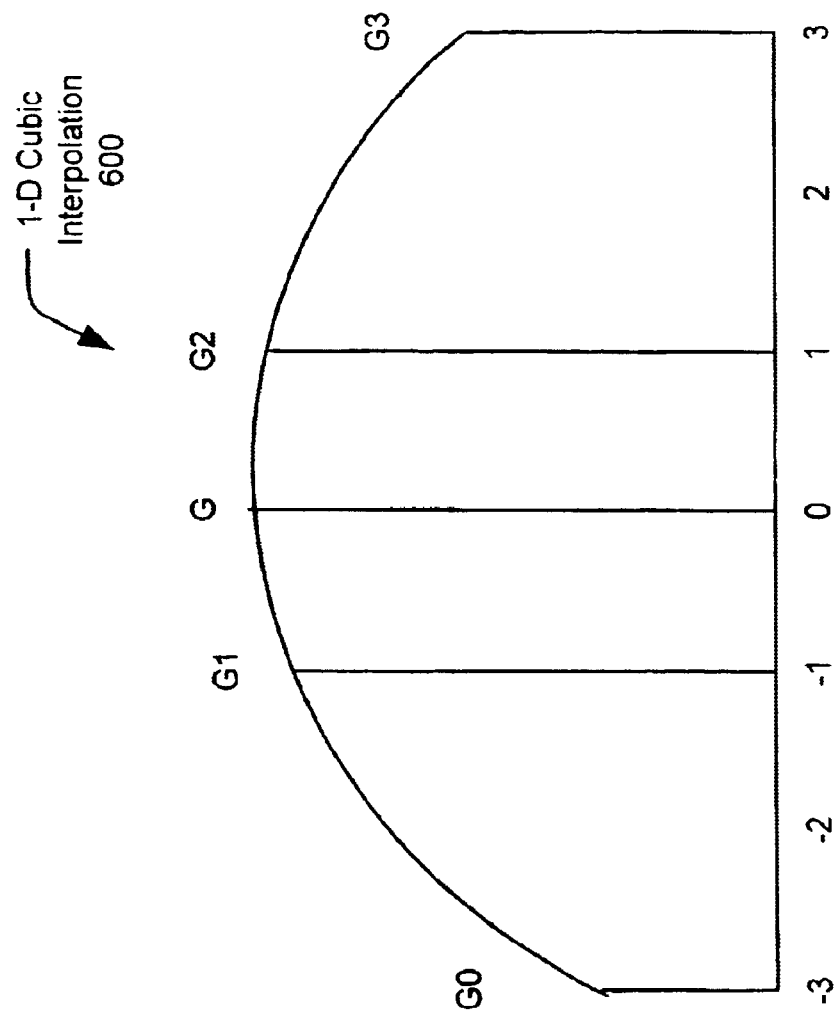
FIG. 8 is a system diagram illustrating an embodiment of one dimensional (1-D) cubic interpolation.

FIG. 8 is a system diagram illustrating an embodiment of one dimensional (1-D) cubic interpolation 600 performed in accordance with the present invention. The cubic interpolation 600 predicts the value of an interpolated point using more supporting points with the hope that the interpolated image is more visually pleasing or perceptually pleasing. The implementation of cubic interpolation 600 is operable to provide for sharper features on an interpolated image than using straightforward linear interpolation.

One-dimensional cubic interpolation at a middle point is described as shown below.

For illustrative purposes, the values of four equal-distanced points are as follows: G0, G1, G2, and G3. The following equations are used in order to find the cubic function that passes through all four points, assuming the general cubic equation $y=a_3 \cdot x^3+a_2 \cdot x^2+a_1 \cdot x^1+a_0$. $a_0$ is equal to the interpolated value at point.

$$\begin{cases} a_3 \cdot (-3)^3 + a_2 \cdot (-3)^2 + a_1 \cdot (-3)^1 + a_0 = G_0 \\ a_3 \cdot (-1)^3 + a_2 \cdot (-1)^2 + a_1 \cdot (-1)^1 + a_0 = G_1 \\ a_3 \cdot (+1)^3 + a_2 \cdot (+1)^2 + a_1 \cdot (+1)^1 + a_0 = G_2 \\ a_3 \cdot (+3)^3 + a_2 \cdot (+3)^2 + a_1 \cdot (+3)^1 + a_0 = G_3 \end{cases}$$

Two new equations can be generated for these four equations.

$$\begin{cases} a_2 \cdot 18 + a_0 \cdot 2 = G_0 + G_3 \\ a_2 \cdot 2 + a_0 \cdot 2 = G_1 + G_2 \end{cases}$$

$$a_0 = \frac{9 \cdot (G_1 + G_2) - (G_0 + G_3)}{16}$$

Figure 9:
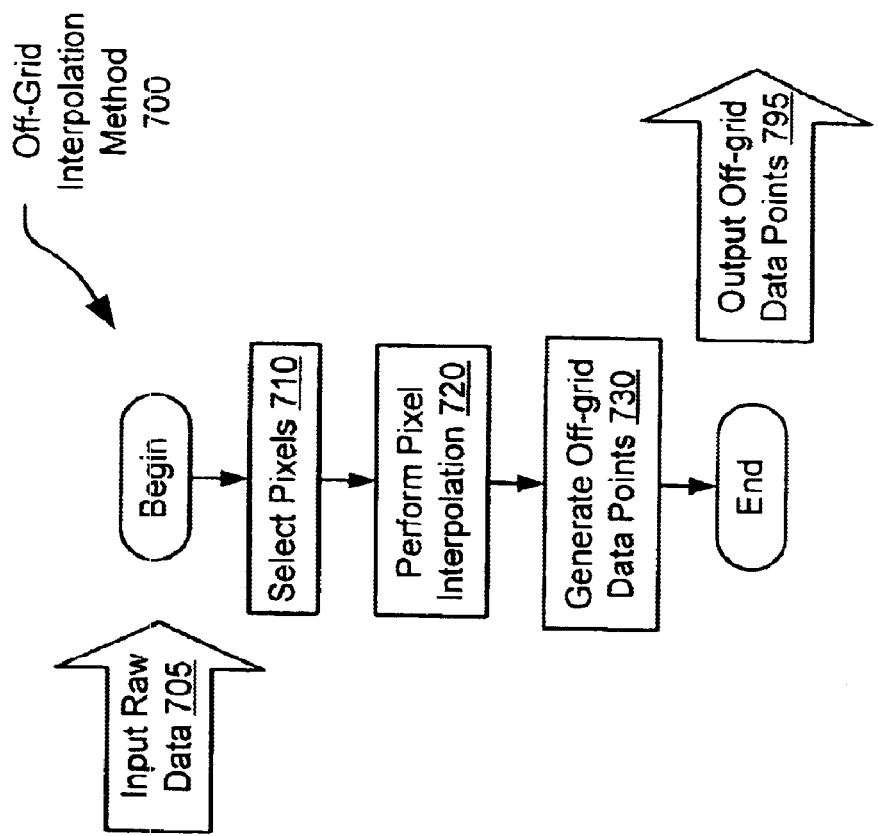
FIG. 9 is a functional block diagram illustrating an embodiment of an off-grid interpolation method.

FIG. 9 is a functional block diagram illustrating an embodiment of an off-grid interpolation method 700. The off-grid interpolation method 700 operates on input data 705 to generate output data 795. In a block 710, a number of pixels are selected. In a block 720, pixel interpolation is performed on the pixels selected in the block 710. In a block 730, off-grid data points are generated using the pixel interpolation that is performed in the block 720. Output off-grid data points 795 are finally generated by the off-grid interpolation method 700.

Figure 10:
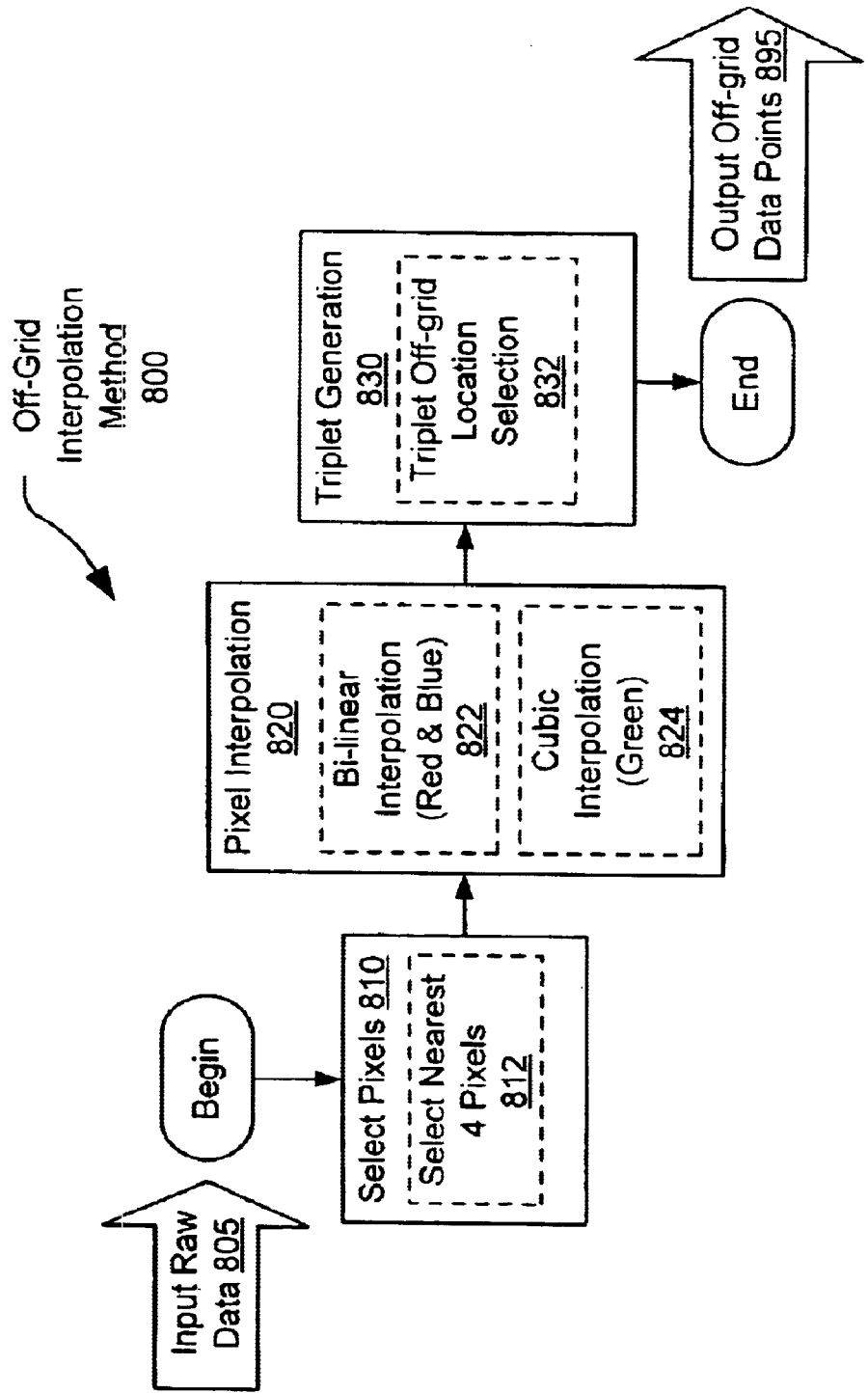
FIG. 10 is a functional block diagram illustrating another embodiment of an off-grid interpolation method.

FIG. 10 is a functional block diagram illustrating another embodiment of an off-grid interpolation method 800. The off-grid interpolation method 800 operates on input data 805 to generate output data 895. In a block 810, a number of pixels are selected. In a block 820, pixel interpolation is performed on the pixels selected in the block 810. In a block 830, off-grid data points are generated using the pixel interpolation that is performed in the block 820. Output off-grid data points 895 are finally generated by the off-grid interpolation method 800. Within the block 810, in one of the various embodiments of the invention, the nearest 4 pixels to the particular pixel being processed are selected as shown in a block 812. Within the block 820, bi-linear interpolation, as described above in various embodiments of the invention, is performed on the red and blue pixels within the mask as shown in a block 822. In addition, within the block 820, cubic interpolation, as described above in various embodiments of the invention, is performed on the green pixels within the mask as shown in a block 814. Within the block 830 triplet off-grid location selection is performed in accordance with the present invention as shown in a block 832. For example, as shown above in the various embodiments, the off-grid locations between the on-grid locations are chosen as being at various locations including equidistant between the on-grid locations and at other non-centered locations between the on-grid locations.

While various embodiments of the invention have been described, it will be apparent to those of ordinary skill in the art that many more embodiments and implementations are possible that are within the scope of this invention.

What is claimed is:

1. An off-grid interpolation image processing system, comprising:

a processing circuitry capable of performing image processing of a plurality of raw input data generating a plurality of off-grid data points;

where the processing circuitry selects a predetermined plurality of neighboring pixels within the plurality of raw input data to generate at least one of the plurality of off-grid data points;

the processing circuitry performs bi-linear interpolation on a plurality of red pixels and on a plurality of blue pixels within the plurality of raw input data;

the processing circuitry performs cubic interpolation on a plurality of green pixels within the plurality of raw input data; and the plurality of off-grid data points comprises a plurality of RGB triplets.

2. The off-grid interpolation image processing system of claim 1, wherein a number corresponding to the predetermined plurality of neighboring pixels to be selected is programmed within the processing circuitry.

3. The off-grid interpolation image processing system of claim 1, wherein a plurality of locations corresponding to the plurality of off-grid data points is programmed within the processing circuitry.

4. The off-grid interpolation image processing system of claim 1, wherein a plurality of locations corresponding to the plurality of off-grid data points is adaptively selected based on the predetermined plurality of neighboring pixels within the plurality of raw input data.

5. The off-grid interpolation image processing system of claim 1, wherein the predetermined plurality of neighboring pixels within the plurality of raw input data comprises the nearest four pixels.

6. The off-grid interpolation image processing system of claim 1, wherein the predetermined plurality of neighboring pixels within the plurality of raw input data comprises the nearest sixteen pixels.

7. The off-grid interpolation image processing system of claim 1, wherein at least one of the plurality of off-grid data points is centrally located between locations of other of the plurality of raw input data.

8. The off-grid interpolation image processing system of claim 1, wherein at least one of the plurality of off-grid data points is not located in a vicinity of the predetermined plurality of neighboring pixels within the plurality of raw input data.

9. An off-grid interpolation image processing system, comprising:

a processing circuitry that is operable to perform image processing of a plurality of raw input data to generate a plurality of off-grid data points;

the processing circuitry selects a predetermined plurality of neighboring pixels within the plurality of raw input data to generate at least one of off-grid data points;

the processing circuitry performs pixel interpolation using the predetermined plurality of neighboring pixels; and at least one of the plurality of off-grid data points is located outside of a region characterized by the predetermined plurality of neighboring pixels.

10. The off-grid interpolation image processing system of claim 9, wherein the processing circuit performs bi-linear interpolation on a plurality of red pixels and on a plurality of blue pixels within the plurality of raw input data; and the processing circuit performs cubic interpolation on a plurality of green pixels within the plurality of raw input data.

11. The off-grid interpolation image processing system of claim 9, wherein a plurality of locations corresponding to the plurality of off-grid data points is programmed within the processing circuitry.

12. The off-grid interpolation image processing system of claim 9, wherein at least one of the plurality of off-grid data points outside of the region characterized by the predetermined plurality of neighboring pixels is off-centrally located between locations of the plurality of raw input data.

13. The off-grid interpolation image processing system of claim 9, wherein the predetermined plurality of neighboring pixels within the plurality of raw input data comprises the nearest four pixels.

14. The off-grid interpolation image processing system of claim 9, wherein at least one of the plurality of off-grid data points is located in a vicinity of the predetermined plurality of neighboring pixels within the plurality of raw input data.

15. The off-grid interpolation image processing system of claim 9, further comprising a mask that performs image capture of the plurality of raw input data in a Bayer pattern format.

16. A method to perform off-grid interpolation, comprising:

inputting a plurality of raw input data to generate a plurality of off-grid data points;

selecting a predetermined plurality of neighboring pixels within the plurality of raw input data to generate at least one of the plurality of off-grid data points;

performing pixel interpolation using the predetermined plurality of neighboring pixels to generate the plurality of off-grid data points; and at least one of the plurality of off-grid data points is located outside of a region characterized by the predetermined plurality of neighboring pixels.

17. The method of claim 16, further comprising:

performing bi-linear interpolation on a plurality of red pixels and on a plurality of blue pixels within the plurality of raw input data; and performing cubic interpolation on a plurality of green pixels within the plurality of raw input data.

18. The method of claim 16, wherein a plurality of locations corresponding to the plurality of off-grid data points is programmed within the processing circuitry is predetermined.

19. The method of claim 16, wherein a plurality of locations corresponding to the plurality of off-grid data points is programmed within the processing circuitry is adaptively selected as a function of the predetermined plurality of neighboring pixels within the plurality of raw input data.

20. The method of claim 16, wherein the predetermined plurality of neighboring pixels within the plurality of raw input data comprises the nearest four pixels.

21. The off-grid interpolation image processing system of claim 9, wherein at least one of the plurality of off-grid data points outside of the region characterized by the predetermined plurality of neighboring pixels is centrally located between locations of the plurality of raw input data.

22. The method of claim 16, wherein at least one of the plurality of off-grid data points outside of the region characterized by the predetermined plurality of neighboring pixels is centrally located between locations of the plurality of raw input data.

23. The method of claim 16, wherein at least one of the plurality of off-grid data points outside of the region characterized by the predetermined plurality of neighboring pixels is off-centrally located between locations of the plurality of raw input data.

24. An off-grid interpolation image processing system, comprising:

a processing circuitry that is operable to perform image processing of a plurality of raw input data to generate a plurality of off-grid data points;

the processing circuitry selects a predetermined plurality of neighboring pixels within the plurality of raw input data to generate at least one of the plurality of off-grid data points;

the processing circuitry performs pixel interpolation using the predetermined plurality of neighboring pixels; and at least one of the plurality of off-grid data points is centrally located between locations of other of the plurality of raw input data, wherein the processing circuit performs bi-linear interpolation on a plurality of red pixels and on a plurality of blue pixels within the plurality of raw input data; and the processing circuit performs cubic interpolation on a plurality of green pixels within the plurality of raw input data.

25. A method to perform off-grid interpolation, comprising:

inputting a plurality of raw input data to generate a plurality of off-grid data points;

selecting a predetermined plurality of neighboring pixels within the plurality of raw input data to generate at least one of the plurality of off-grid points;

performing pixel interpolation using the predetermined plurality of neighboring pixels to generate the plurality of off-grid data points;

performing bi-linear interpolation on a plurality of red pixels and on a plurality of blue pixels within the plurality of raw input data;

performing cubic interpolation on a plurality of green pixels within the plurality of raw input data; and at least one of the plurality of off-grid data points is centrally located between locations of other of the plurality of raw input data.

* * * * *

UNITED STATES PATENT AND TRADEMARK OFFICE
CERTIFICATE OF CORRECTION

PATENT NO. : 6,961,480 B2
DATED : November 1, 2005
INVENTOR(S) : Bao et al.

It is certified that error appears in the above-identified patent and that said Letters Patent is hereby corrected as shown below:

Column 8,
Line 53, "data to generate at least one of off-grid data points;" should read
-- data to generate at least one of the plurality of off-grid data points; --.

Signed and Sealed this

Sixth Day of June, 2006

JON W. DUDAS
*Director of the United States Patent and Trademark Office*